United States Patent [19]

Goodson et al.

[11] 4,145,484

[45] Mar. 20, 1979

[54] SAFE HIGH ENERGY DENSITY BATTERY

[75] Inventors: Forrest R. Goodson, Campbell; William H. Shipman, La Mesa; Joseph F. McCartney, Solana Beach, all of Calif.

[73] Assignee: The United States of America as represented by the Secretary of the Navy, Washington, D.C.

[21] Appl. No.: 871,562

[22] Filed: Jan. 23, 1978

[51] Int. Cl.² ............................................. H01M 6/00
[52] U.S. Cl. ..................................... 429/105; 429/201
[58] Field of Search ............... 429/101, 105, 199, 201, 429/194, 219

[56] References Cited

U.S. PATENT DOCUMENTS

| | | | |
|---|---|---|---|
| 3,658,593 | 4/1972 | Caiola et al. | 429/201 X |
| 3,816,177 | 6/1974 | Walsh | 429/194 |
| 3,817,791 | 6/1976 | Greatbatch et al. | 429/101 |
| 3,994,747 | 11/1976 | Greatbatch et al. | 429/199 |

*Primary Examiner*—Anthony Skapars
*Attorney, Agent, or Firm*—Richard S. Sciascia; Ervin F. Johnston

[57] ABSTRACT

A safe high energy density battery which includes a lithium anode, a catholyte of bromine, and an electrolyte of tetrabutylammonium bromine.

6 Claims, 1 Drawing Figure

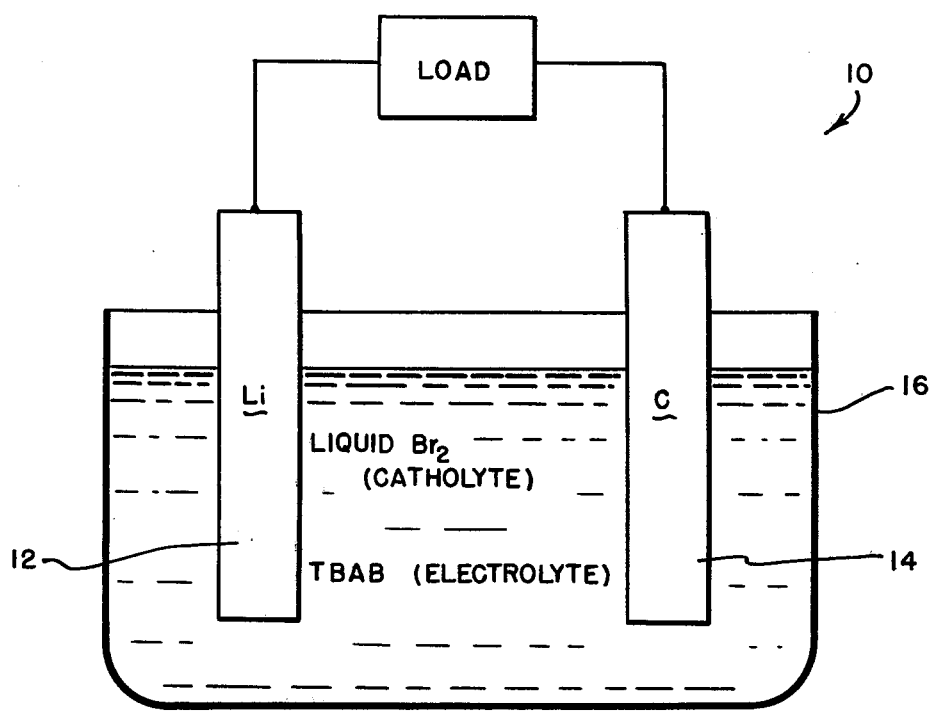

SAFE HIGH ENERGY DENSITY BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

There is a need for high energy density batteries for many applications, such as torpedoes, oceanographic or meteorological instrumentation, and field communications equipment. The lithium battery is a prime candidate for solving this problem. Lithium is an electronegative metal and has a low atomic weight, thereby making it capable of yielding high power per unit volume or mass. One of the conditions that should be met in a lithium battery utilizing a liquid catholyte is that the lithium be passivated by some process so as to prevent a violent reaction between the lithium and the liquid catholyte. A high energy density battery or lithium which is safe, even though abused, would be extremely desirable for many battery applications.

SUMMARY OF THE INVENTION

The present invention provides a high energy density lithiun battery which is safe, even though it is abused by such conditions as shorting, heating, or puncturing. This has been accomplished by providing a lithium anode, a catholyte of liquid bromine, and an electrolyte from the group of quaternary ammonium salts. The preferred electrolyte is tetrabutylammonium bromide.

OBJECTS OF THE INVENTION

An object of the present invention is to provide a safe high energy density battery.

Another object is to provide a high energy density lithium battery which is safe even when abused.

A further object is to provide a method of constructing a safe high energy density battery.

These and other objects of the invention will become more readily apparent from the ensuing specification when taken together with the drawing.

DESCRIPTION OF THE DRAWING

The drawing is a schematic illustration of a safe high energy density battery.

DESCRIPTION OF THE PREFERRED EMBODIMENT

Referring now to the drawing a high energy density battery 10 was constructed utilizing a lithium anode 12, which is originally uncoated, a catholyte of liquid bromine, and an electrolyte of tetrabutylammonium bromide (TBAB), the latter being from the group of quaternary ammonium salts. The tetrabutylammonium bromide was a 2 mole concentration in the liquid bromine. A current collector 14 of carbon may be utilized as the other electrode in a casing which is illustrated schematically at 16. The voltage output of the battery was approximately 4 volts. This voltage is very close to the reduction potentials set forth in the literature, which are as follows:

$$Br_2 + 2e \rightarrow Br^- + 1.065V$$

$$2 Li^+ + 2 e \rightarrow 2Li - 3.045V$$

The reaction of the battery is as follows:

$$2Li + Br_2 \rightarrow 2 Li Br$$

It was found that the conductivity of the tetrabutylammonium bromide in the liquid bromine was 15 ohms$^{-1}$ cm$^{-2}$. This superior conductivity significantly contributes to the high energy density of the battery.

While the battery was originally constructed with an uncoated lithium anode, the lithium was coated with a film of lithium bromide immediately upon contact with the liquid bromine by the reaction therebetween. The film of lithium bromide on the lithium anode prevents any violent reaction which would normally take place between lithium and the liquid bromine. The aforementioned combination provides a very unique high energy density battery which is safe even though abused by such conditions as shorting, heating or puncturing. Such a battery would be useful in any situation where high energy density is a factor, particularly in an area where the battery may be abused.

The method of constructing the battery 10 includes providing a catholyte of liquid bromine, inserting an electrolyte of 2 moles of tetrabutylammonium bromide in the catholyte, and placing an anode of uncoated lithium in the catholyte-electrolyte solution. Obviously, many modifications and variations of the present invention are possible in the light of the above teachings, and, it is therefore understood that within the scope of the disclosed inventive concept, the invention may be practiced otherwise than as specifically described.

What is claimed is:

1. In a battery, the improvement comprising:
    a lithium anode;
    an electrolyte of tetra-butylammonium bromide;
    a catholyte of liquid bromine; and
    the electrolyte being dissolved in the liquid bromine.
2. The improvement as claimed in claim 1 including:
    the tetrabutylammonium bromide being a 2 mole concentration in the liquid bromine.
3. A safe high energy density battery consisting essentially of:
    a casing;
    a lithium anode;
    a catholyte of liquid bromine;
    an electrolyte of tetrabutylammonium bromide;
    the electrolyte being dissolved in the liquid bromine; and
    a current collector.
4. A battery as claimed in claim 1 further consisting essentially of:
    the anode being lithium coated with a film of lithium bromide from the reaction of the lithium with the liquid bromine.
5. A battery as claimed in claim 4 further consisting essentially of:
    the tetrabutylammonium bromide being a 2 mole concentration in the liquid bromine.
6. A method of constructing a safe high energy density battery comprising the steps of:
    providing a catholyte of liquid bromine;
    inserting an electrolyte of 2 moles of tetrabutylammonium bromide in the catholyte; and
    placing an anode of uncoated lithium in the catholyte-electrolyte solution.

* * * * *